United States Patent [19]

Shiraki et al.

[11] Patent Number: 4,802,224
[45] Date of Patent: Jan. 31, 1989

[54] REFERENCE SPEECH PATTERN GENERATING METHOD

[75] Inventors: Yoshinao Shiraki, Tokyo; Masaaki Honda, Kodaira, both of Japan

[73] Assignee: Nippon Telegraph and Telephone Corporation, Tokyo, Japan

[21] Appl. No.: 909,993

[22] Filed: Sep. 22, 1986

[30] Foreign Application Priority Data

Sep. 26, 1985 [JP] Japan .................. 60-213193
Mar. 19, 1986 [JP] Japan .................. 61-61593

[51] Int. Cl.⁴ .......................... G10L 5/00
[52] U.S. Cl. .................... 381/41; 381/34
[58] Field of Search .............. 381/29–35, 381/41–43

[56] References Cited

U.S. PATENT DOCUMENTS

| | | | |
|---|---|---|---|
| 3,674,939 | 7/1972 | Brooks | 381/29 |
| 3,909,532 | 9/1975 | Rabiner et al. | 381/41 |
| 3,969,698 | 7/1976 | Bollinger et al. | 381/43 X |
| 4,078,154 | 3/1978 | Suzuki et al. | 381/42 |
| 4,130,729 | 12/1978 | Gagnon | 381/30 |
| 4,229,622 | 10/1980 | Cochrane | 381/29 X |
| 4,267,407 | 5/1981 | Schindler et al. | 381/30 |
| 4,412,098 | 10/1983 | An | 364/513.5 X |
| 4,601,054 | 7/1986 | Watari et al. | 381/42 X |
| 4,658,369 | 4/1987 | Sugiura | 381/34 X |
| 4,677,673 | 6/1987 | Ukita et al. | 381/43 |
| 4,720,802 | 1/1988 | Damoulakis et al. | 381/43 X |

FOREIGN PATENT DOCUMENTS 8704290 7/1987 PCT Int'l Appl. .................. 381/34

Primary Examiner—Patrick R. Salce
Assistant Examiner—Marc S. Hoff
Attorney, Agent, or Firm—Pollock, Vande Sande and Priddy

[57] ABSTRACT

A time series of spectral parameters is extracted from a learning speech, the spectral parameters are divided into a plurality of segments for each voice interval, and the segments are clustered into a plurality of clusters. For each cluster an initial reference pattern representing the cluster is computed. The segment boundaries are corrected using the computed reference patterns (a correcting step), the segments of the corrected spectral parameter time series are clustered (a clustering step), and for each cluster, a reference pattern representing the cluster is computed (a reference pattern computing step). The correcting step, the clustering step, and the reference pattern computing step are performed at least once, and the reference patterns obtained by the last reference pattern computing step are regarded as reference patterns desired to be obtained.

10 Claims, 8 Drawing Sheets

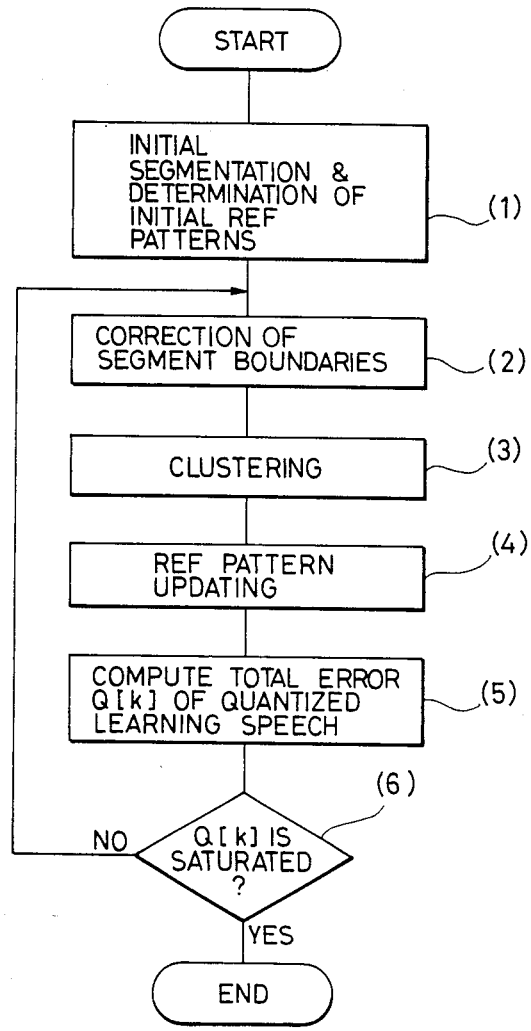

REFERENCE SPEECH PATTERN GENERATING METHOD

BACKGROUND OF THE INVENTION

The present invention relates to a reference speech pattern generating method for generating from a learning speech reference patterns to be used for speech coding, speech recognition, text-to-speech synthesis for synthesizing a sentence into speech, or the like, where pattern matching is performed.

As a speech coding method using a pattern matching technique, a segment vocoder is proposed in ICASSP'82, Bolt Beranek and Newman Inc., "Segment Quantization for Very-Low-Rate Speech Coding". According to this method, as shown in FIG. 1, a speech signal from an input terminal 11 is converted into a time series of spectral patterns 12, which is divided into several segments $S_1$, $S_2$ and $S_3$ of time lengths by spectral analysis and segmentation section 20, and each segment is coded in a quantization section 14 by matching with a reference pattern read out of a reference pattern memory 13.

In the coding methods of the type which processes the input speech in units of segments, it is commonly important to decide what method should be employed for each of (1) a segment dividing method, (2) a pattern matching method, and (3) a reference pattern generating method. The above-mentioned segment vocoder divides the input speech into variable length segments on the basis of its rate of spectral change for (1), performs spectral matching based on equal interval samplings of the trajectory in a spectral parameter space for (2), and generates reference patterns by a random learning for (3).

However, the segment vocoder employs different criteria for the segmentation and for the matching, and hence does not minimize, as a whole, the spectral distortion that gives a measure of the speech quality. Furthermore, since the spectral matching loses time information of spectral variations in each segment, the coded speech is accompanied by a spectral distortion. In addition, the reference pattern generating method in itself is heuristic and therefore the reference pattern for the variable length segment data is not optimum for reducing the spectral distortion. On this account, the prior art system cannot obtain sufficient intelligibility for a very low bit rate code around 200 b/s.

SUMMARY OF THE INVENTION

An object of the present invention is to provide a reference pattern generating method which is capable of generating excellent reference patterns, and hence achieves high intelligibility even for very low bit rates in speech coding, enhances the recognition ratio in speech recognition, and permits the generation of good quality speech in text-to-speech synthesis.

It is another object of the present invention to provide a speech coding method which permits the reconstruction of sufficiently intelligible speech at very low bit rates around 200 b/s.

According to the present invention, a learning speech is input, its spectral parameters are extracted in units of frames, a time series of the extracted spectral parameters is divided into segments, the segments are clustered, and a reference pattern of each cluster is computed (a first step). Then the segment boundaries are corrected through use of the reference patterns for optimum segmentation (a second step). The segments thus divided are clustered, and a reference pattern of each cluster is computed, updating the reference patterns (a third step). The correction of the segmentation in the second step and the reference pattern updating in the third step are performed at least once.

The computation of the reference patterns in the first and second steps can be effected through utilization of a so-called vector quantization technique. That is, a centroid of segments in each cluster is calculated to define a centroid segment and is used as the updated reference pattern. The correction of the segment boundaries by the updated reference patterns and the updating of the reference patterns are repeated so that each cluster is sufficiently converged. The final centroid segment of each cluster is defined to be a reference pattern. Upon each repetition of the third step, the total quantization error which will be caused by coding the learning speed with the reference patterns, is computed, and the second and third steps are repeated until the quantization error is saturated. In the prior art, the initial reference patterns obtained by the first step are employed as reference patterns for speech coding or the like. In the present invention, however, by repeating the second and third steps, the updated reference patterns will promise more reduction in the total quantization error for the learning speech than the initial reference patterns; so that it is possible to obtain reference patterns which represent the learning speech faithfully.

According to the speech coding method of the present invention, spectral parameters of an input speech are extracted therefrom in units of frames to produce a time series of spectral parameters. This spectral parameter time sequence is divided into segments, each having a time length of about a phoneme. The segment boundaries of the segment sequence are corrected so that the matching distance between the segment sequence and reference patterns each of a fixed time length is minimized, thus determining a reference pattern sequence which is most closely similar to the segment sequence, and also segment boundaries thereof. The matching of the segment with the reference pattern is effected by adjusting the length of the latter to the length of the former. Codes of the segment lengths determined by the selected segment boundaries and codes of the reference patterns for the segments are output. That is, in the speech coding method of the present invention, the quantization error is minimized by associating the determination of the segment boundaries and the selection (matching) of the reference patterns with each other. Furthermore, since the reference patterns obtained by the reference pattern generating method of the present invention are employed for the speech coding, both the same process and the same measure of distance can be used for the determination of the segment boundaries and the reference patterns in coding and also for the correction of the segment boundaries and the updating of the reference patterns in the reference pattern generating process. Therefore, the reference patterns well match the coding method, ensuring accurate coding accordingly.

The most similar reference patterns are determined through correcting the segment boundaries and selecting reference patterns so that the matching distance between the afore-mentioned segment sequence and a sequence of the selected reference patterns each of a fixed time length may become minimum. This determination process is repeated while changing the number of segments for each time until a series of the minimum matching distances are obtained. The rate of change of the minimum matching distances relative to the segment numbers, and the smallest one of the segment numbers which make the absolute value of the rate of change smaller than a predetermined value, are obtained. Then codes indicating the segment boundaries (or the segment lengths) which minimize the matching distance, which becomes minimum for the smallest segment number, and codes indicating the reference patterns at that time are output. In this way, a coded output can be obtained which is small in the quantization error and in the amount of output information.

BRIEF DESCRIPTION OF THE DRAWINGS

FIG. 3 is a flowchart showing an example of the reference pattern generating method of the present invention;

DESCRIPTION OF THE PREFERRED EMBODIMENTS

Reference Pattern Generating Method

Figure 1:
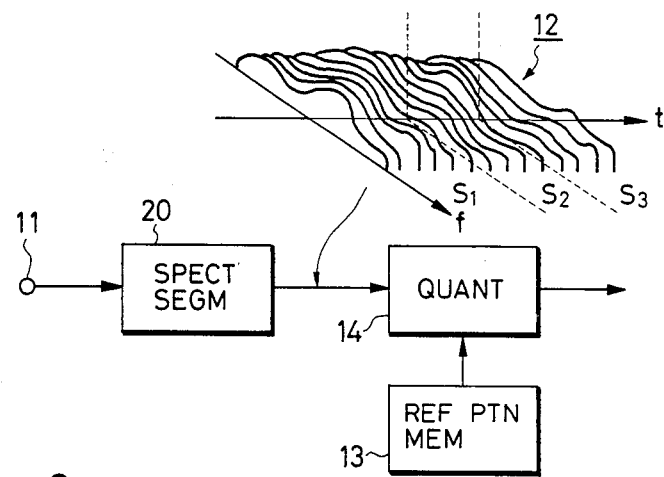
FIG. 1 is a block diagram illustrating a prior art arrangement for a speech coding method which quantizes a speech signal through use of reference patterns.
Figure 2:
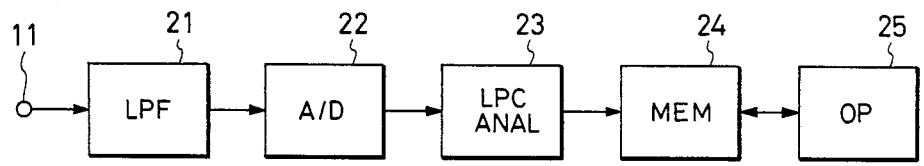
FIG. 2 is a block diagram illustrating an example of the arrangement for performing the reference pattern generating method of the present invention.

As shown in FIG. 2, a learning speech signal from an input terminal 11 is applied to a low-pass filter 21, wherein it is limited to a band of, for example, lower than 4000 Hz. The thus band-limited learning speech signal is converted by an A-D converter 22 into a digital signal through periodic sampling (8 KHz in this example). The digital signal is then subjected to a linear predictive analysis in an LPC analysis section 23, by which spectral parameters of the input learning speech signal are extracted. In this case, the analysis window is, for instance, 30 milliseconds long, the analysis is of twelfth order, and a time series of LSP (Line Spectrum Pair) parameters ($\theta_1, \theta_2, \ldots, \theta_{12}$) and a logarithmic speech power P are obtained every 10 msec with the 30-msec-analysis window. The time series of spectral parameters of the learning speech thus obtained are stored in a memory 24. An operation section 25 reads out the spectral parameters from the memory 24 and creates reference patterns by processing them in the manner described below.

Figure 4:
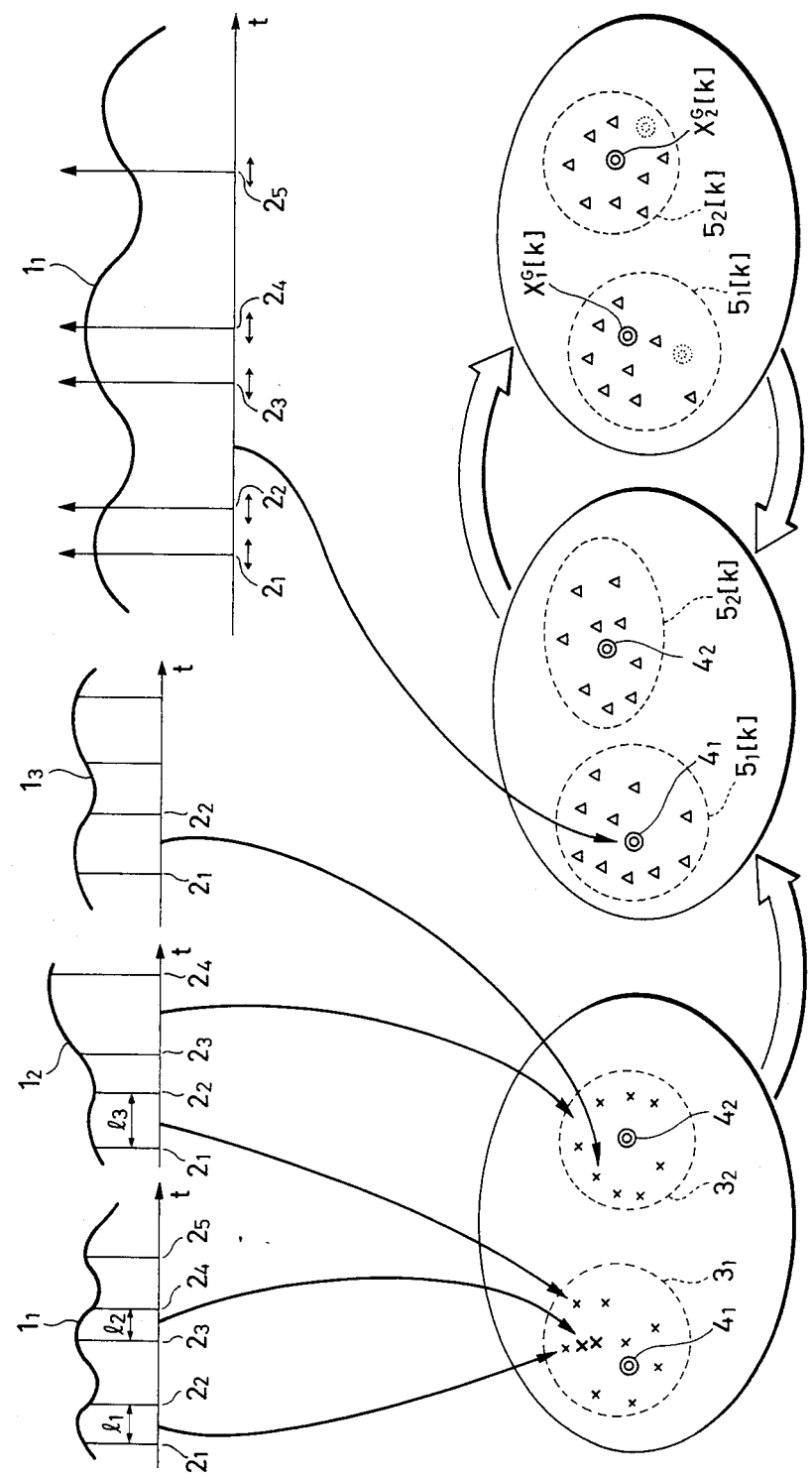
FIG. 4 is a schematic diagram showing an example of the reference pattern generating method of the present invention.

FIG. 3 shows the flow of the processing for segmentation of the time series of spectral parameters of the learning speech, clustering of the segments, and obtaining a reference pattern of each cluster. This initial segmentation is performed, for example, by dividing the spectral parameter time series at phoneme boundaries which are observed on a sonagram of the learning speech. The dividing positions will hereinafter be referred to as segmentation positions or segment boundaries. For instance, as depicted in FIG. 4, voice intervals $1_1, 1_2, 1_3, \ldots$ of the learning speech are segmented at segment boundaries $2_1, 2_2, 2_3, 2_4, \ldots$, and these segments are clustered. This is, similar ones of a number of segments are grouped into a fixed number of clusters $3_1, 3_2, \ldots$ according to similarity, in each of which crosses are shown to indicate the segments. The centroid segments $4_1, 4_2, \ldots$ of the clusters $3_1, 3_2, \ldots$ are obtained. The centroid segments $4_1, 4_2, \ldots$ are determined by repeating clustering of all the segments and computations for the centroid segments so as to minimize the overall error which would result from replacement of the respective original segments of the speech with the most similar ones of the centroid segments ultimately obtained. Spectral patterns which are formed by the centroid segments are used as initial reference patterns (step (1)). The initial reference patterns can be obtained through use of a method disclosed in, for instance, A. Buzo, et al., "Speech Coding Based upon Vector Quantization", IEEE Trans., ASSP-28, pp. 562-574 (1980).

Each reference pattern (i.e. centroid segment) is represented by a 13 by 10 matrix $X^G$ in which the weighted LSP parameters $W_1\theta_1, W_2\theta_2, \ldots$, and the weighted logarithmic speech power parameter $W_{pw}P$ are arrayed in rows and columns, as shown below.

$$\begin{pmatrix} W_{pw}P_1 & W_{pw}P_2 & \ldots & W_{pw}P_{10} \\ W_1\theta_{1,1} & W_1\theta_{1,2} & \ldots & W_1\theta_{1,10} \\ W_2\theta_{2,1} & W_2\theta_{2,2} & \ldots & W_2\theta_{2,10} \\ \vdots & & & \\ W_{12}\theta_{12,1} & W_{12}\theta_{12,2} & \ldots & W_{12}\theta_{12,10} \end{pmatrix} = X^G \quad (1)$$

Each of the segments into which a time series of the speech spectral parameters is divided will be represented by $X_j$ (a 13 by 1 matrix). The matching distance between the segment $X_j$ and the reference pattern $X^G$ is defined by a weighted Euclidean distance including power after subjecting the reference pattern $X^G$ to a linear transformation to adjust its length to be equal to the length of the segment $X_j$. That is, letting $H_l$ represent a projection matrix for converting a 10-dimensional matrix into an l-dimensional one through a linear transformation, the matching distance $d(X^G, X_j)^2$ between the segment $X_j$ and the reference pattern $X^G$ is given by the following equation (2):

$$d(X^G, X_j)^2 = |X_j - X^G H_l|^2 \equiv |C|^2 \qquad (2)$$

where $$\|C\|^2 = \sum_{i=1}^{13} \sum_{j=1}^{l} C_{ij}^2$$

$C_{ij}$ is the element of a matrix C and $$X^G H_l = \begin{pmatrix} W_{pw} P_1' & \cdots & W_{pw} P_l' \\ W_1 \theta_{1,1}' & \cdots & W_1 \theta_{1,l}' \\ \vdots & & \vdots \\ W_{12} \theta_{12,1}' & \cdots & W_{12} \theta_{12,l}' \end{pmatrix}$$

The weights $W_1, W_2, \ldots$ for the LSP parameters $\theta_1, \theta_2, \ldots$ are determined by the least square approximation of a weighted LPC Cepstrum, and the weight $W_{pw}$ for the logarithmic power is determined by hearing test results so that the sound articulation score is maximum.

Letting the set of segments of the cluster $3_1$ in FIG. 4 be represented by $X = \{X_j, j = 1, 2, \ldots Nc\}$ (where Nc is the number of elements of X) and the segment length (time length) of the segment $X_j$ be represented by $l_j$, the centroid segment $X^G$ can be obtained using the equation (2) as a measure of distance so that the quantization error becomes minimum. That is, the following equation (3) is computed:

$$X^G = \left( \sum_{j=1}^{Nc} X_j H_{l_j}^t \right) \left( \sum_{j=1}^{Nc} H_{l_j} H_{l_j}^t \right)^+ \qquad (3)$$

In the above, B+ indicates a generalized inverse matrix of B and $C^t$ a transposed matrix of C.

Because of the property of the centroid segment $X^G$ obtainable from the equation (3), the following equation (4) holds:

$$\sum_{j=1}^{Nc} d(X_j, X^G)^2 \leq \sum_{j=1}^{Nc} d(X_j, X^{G'})^2, \text{ for all } X^{G'} \neq X^G \qquad (4)$$

The segment boundaries of the spectral parameter time series $l_1, l_2, \ldots$ of the learning speech are corrected by dynamic programming through utilization of the initial reference patterns obtained as described above (step (2) in FIG. 3). Such dynamic programming (sometimes called "dynamic programming matching" or simply "DP matching") is in itself a well known pattern recognition algorithm that is described in the text "Methods of Nonlinear Analysis", R. Bellman, Vol. II, pp 75–115, Academic Press, 1973. For instance, as shown in FIG. 4 in connection with the voice interval $l_1$ of the learning speech, the segment boundaries $2_1, 2_2, \ldots 2_5$ are slightly shifted so that the sum of the matching distances in the voice interval $l_1$ may become minimum. This processing for correcting the segment boundaries is performed for each of the voice intervals of the learning speech. More specifically, candidates of segment boundaries $T_s'$ (s = 1, 2, ..., M) have been determined in advance. An accumulated distance (the sum of matching distances) up to a time $T_s$ in one voice interval $I_m$ is represented by $\sigma(T_s)$, the number of segments in the voice interval $I_m$ is represented by M, the segment boundary correcting width $\alpha$ is properly selected, and a time $T_{s-1}$ is determined by the following recursive formula:

$$\sigma(T_s) = \min_{T_{s-1}} \{\sigma(T_{s-1}) + d(T_{s-1}, T_s)^2\} \qquad (5)$$

where $$|T_s' - T_{s-1}| \leq \frac{\Delta - 1}{2}$$

In the above, S = 1, 2, ... M, $\sigma(T_0) = 0$, and d is the matching distance obtained by the equation (2) when the segments of the learning speech from the time $T_{s-1}$ to $T_s$ are quantized with the reference patterns.

A time $T_M$ is determined to minimize an end point accumulated distance $\sigma(T_M)$, and the correction points of the segment boundaries obtained by the equation (5) are determined one after another.

This means the following:

a. Letting the quantization error before correcting the segment boundaries in the voice interval $I_m$ be represented by $Q_m^I$ and the quantization error after correcting the segment boundaries be represented by $Q_m^*$, the following equation holds:

$$Q_m^* \leq Q_m^I \qquad (6)$$

This indicates that the correction of the segment boundaries ensures a decrease in the quantization error. This property will hereinafter be referred to as the suboptimum property in the reference pattern generation.

b. With a sufficiently large correction width $\Delta$, the quantization error after the correction of segment boundaries is not larger than that before correction. In other words, in the case of representing the voice interval by a series of reference patterns individually adjusted in length, it is possible to select optimum reference patterns and optimum adjustment of their length.

The segments of the learning speech spectral parameter time series thus corrected in segment boundaries are again grounded into clusters $5_1, 5_2, \ldots$, as depicted in FIG. 4 (step (3) of FIG. 3). In FIG. 4, triangles are shown to indicate that the segments of the clusters $5_1, 5_2, \ldots$ have replaced the segments of the clusters $3_1, 3_2, \ldots$. When the segments of the learning speech were quantized through use of the reference patterns in step (2), a number denoting the reference pattern for each segment was stored. In step (3), the segments quantized by the reference patterns $X_i^G[0]$ are collected into one cluster $5_i$. This clustering takes place for each reference pattern, obtaining N clusters $5_1[1], 5_2[1], \ldots 5_N[1]$.

The centroid segment of each cluster $5_i[1]$ is calculated by equation (3) to obtain an updated reference pattern $X_i^G$ (step (4) of FIG. 3). In practice, clustering of the segments into N clusters and the selection of the reference patterns are repeated in the same manner as the initial reference patterns were obtained until a measure of distortion becomes converged, thereby obtaining the updated reference patterns. FIG. 4 shows how the reference patterns are updated. Next, computation is performed to obtain the total quantization error $Q[1]$ caused when the learning speech signal is quantized using the updated reference patterns $X_j^G[1]$ (5)).

The total quantization error Q[1] is stored. Next, the process returns to step (2), in which the segment boundaries are corrected again using the updated reference patterns $X_i^G[1]$, the learning speech is subjected again to segment clustering on the basis of the corrected segment boundaries to obtain clusters $5_i[2]$, and the centroid segment of each of the clusters $5_i[2]$ is computed, thus producing reference patterns $X_i^G[2]$. The total quantization error Q[2] of the learning speech quantized by the reference patterns is calculated. Thereafter the same operation is repeated. Upon each calculation of the total quantization error Q[k] (where k = 1, 2, ...) in step (5), it is compared with each of the total quantization errors Q[1], Q[2], ... Q[k−1] obtained so far, and it is checked whether the decrease in the total quantization error has saturated or not. If not saturated (or when not smaller than a predetermined value), the process returns to step (2); whereas if saturated (or when smaller than the predetermined value), the process is terminated and the reference patterns $X_i^G[k]$ at that time are regarded as the reference patterns desired to be obtained.

Now, letting the quantization error (the matching distance) in the voice interval $I_m$ be represented by $Q_m^I$, the quantization error in the cluster $3_i$ by $Q_i^C$, the number of voice intervals in the learning speech by M and the number of clusters by N, the total quantization error Q[k] of the learning speech quantized by the reference patterns $X_i^G[k]$ is given as follows:

$$Q[k] = \sum_{m=1}^{M} Q_m^I[k] = \sum_{i=1}^{N} Q_i^C[k] \quad (7)$$

Letting the quantization error of the voice interval be represented by $q_m^*[k-1]$, we obtain the following equation from equation (6):

$$Q_m^*[k-1] \leq Q_m^I[k-1] \quad (8)$$

This holds for any given voice intervals. Therefore, letting the total quantization error in the case of an optimum representation of the learning speech by a series of adjusted reference patterns be represented by $Q^*[k-1]$, the following equation holds:

$$Q^*[k-1] = \sum_{m=1}^{M} Q_m^*[k-1] \leq \sum_{m=1}^{M} Q_m^I[k-1] = Q[k-1] \quad (9)$$

Letting an unupdated reference pattern corresponding to a given cluster $C_i = \{X_j, j \in A_i\}$ (where $A_i$ is a set of the segment numbers belonging to the cluster $C_i$) be represented by $X_i^G[k-1]$, the updated reference pattern by $X_i^G[k]$, the quantization error of the cluster $C_i$ due to the unupdated reference pattern $X_i^G[k-1]$ by $Q_i^C[k-1]$, and the quantization error due to the updated reference pattern $X_i^G[k]$ by $Q_i^C[k]$, we obtain the following equation from the equation (4):

$$Q_i^C[k] = \quad (10)$$

$$\sum_{j \in A_i} d(X_j, X_i^G[k])^2 \leq \sum_{j \in A_i} d(X_j, X_i^G[k-1])^2 = Q_i^C[k-1]$$

This holds for any given clusters. Therefore, letting the total quantization error due to the unupdated reference patterns be represented by $Q^C[k-1]$, the following equation holds:

$$Q[k] = \sum_{i=1}^{N} Q_i^C[k] \leq \sum_{i=1}^{N} Q_i^C[k-1] = Q^C[k-1] \quad (11)$$

Since $Q^C[k-1] = Q^*[k-1]$, the following equation holds for a given K, from the equations (9) and (11):

$$Q[k] \leq Q^C[K-1] = Q^*[k-1] \leq Q[k-1] \quad (12)$$

That is, in the process shown in FIG. 3, the following equation theoretically holds:

$$Q[0] \geq Q[1] \geq \ldots \geq Q[k-1] \geq Q[k] \quad (13)$$

It is seen that as the k is increased, more preferable reference patterns can be obtained.

We conducted experiments for analysis under the conditions given below and ascertained through actual voices that optimum reference patterns can be obtained by the method described above.

TABLE 1

| Conditions for Analysis | |
|---|---|
| Sample period | 8 KHz |
| Analysis window | 30 ms Hamming, 10 ms shift |
| Analysis parameter | 12th order LSP (12th Cepstrum) |
| Reference pattern | time length (L = 10), number (N = 64) |
| Optimum Construction method | correction width Δ = 33 under the condition that the longest segment is of 32 frames |
| Speech contents | reading voice of a long sentence (continuous speech) |
| Speaker | a male speaker |
| Learning data | number of segments = 2136 |
| Non-learning data | number of segments = 1621 |

Figure 5:
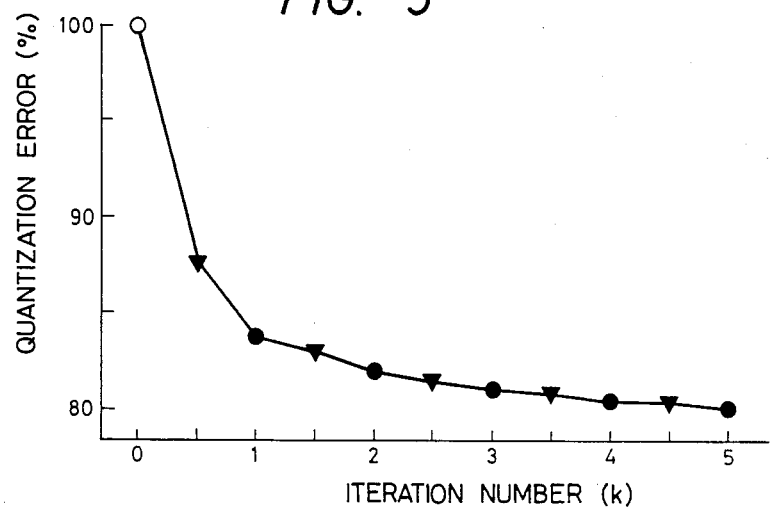
FIG. 5 is a graph showing an example of a quantization error vs. iteration number characteristic.

The experimental results are shown in FIG. 5. In FIG. 5, the ordinate represents the reduction rate of error ($=100 \cdot Q[k]/Q[0]$) and the abscissa the number of iterations k, that is, the number of updatings of reference patterns. The plotted triangular points between the circular points of the reference pattern updating numbers indicate the error reduction rate ($=100 \cdot Q[k]/Q[0]$) after the correction of the segment boundaries. FIG. 5 verifies a monotonous decrease of the total quantization error, that is, the sub-optimum property of the method described above. The reduction rate diminishes to 80 % or so when the iteration number is 3, indicating the effectiveness of the process shown in FIG. 3. Further, it is seen that even one updating of the reference patterns markedly decreases the total quantization error.

Speech Coding Method

Next, a description will be given of the speech coding method of the present invention which utilizes the reference patterns generated as set forth above.

Figure 6:
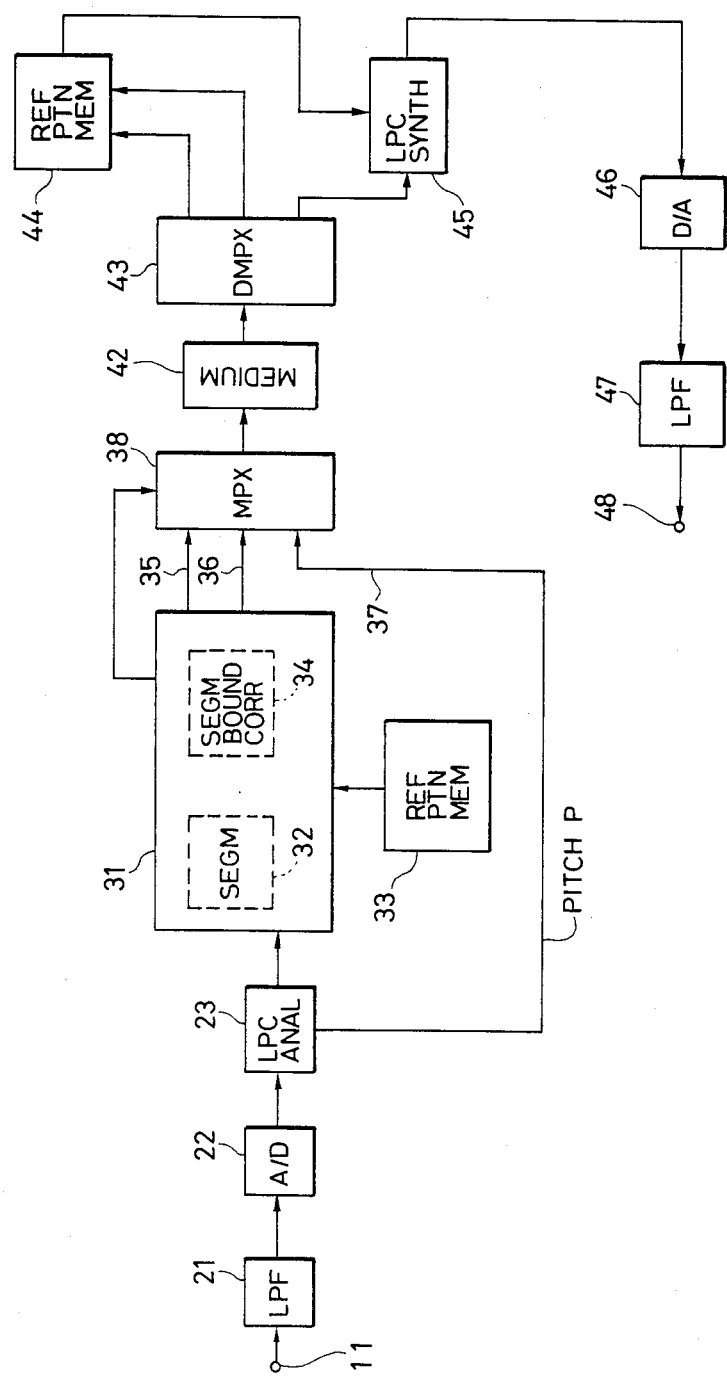
FIG. 6 is a block diagram illustrating an example of the arrangement for performing the speech coding method of the present invention.

FIG. 6 illustrates in block form an embodiment of the speech coding method of the present invention. A speech input from an input terminal 11 is band limited by a low-pass filter 21 and is then provided to an A-D converter 22, wherein it is converted to digital form through periodic sampling (8000 times per second, in this example). The output of the A-D converter 22 is applied to an LPC analysis section 23, wherein spectral parameters of the input speech are extracted. A time series of the input speech spectral parameters thus LPC-analyzed and computed is provided to a segmentation section 32 of a coding section 31, wherein it is divided into segments each of about a length of a phoneme. The thus divided segment sequence is applied to a segment boundary correction section 34, wherein the segment boundaries are corrected through use of dynamic programming so that the matching distance between the segment sequence and reference patterns prestored in a reference pattern memory 33 becomes minimum. Then each segment length according to the corrected segment boundaries is coded, and the code 35 and the number 36 of a reference pattern which is most similar to the segment concerned are output from the coding section 31. In the reference pattern memory 33 are prestored reference patterns produced by the afore-described reference pattern generating method of the present invention. The matching distance between the segment sequence and the reference patterns is defined by a weighted Euclidean distance including power after linearly transforming the prepared reference patterns and adjusting their lengths to the input segment lengths. In the reference pattern memory 33 is stored the reference patterns $X^G$ in the form of the matrix shown by the afore-mentioned equation (1). For the input segment $X_j$ (a 13 by 1 matrix), as in the case of the equation (2), reference pattern $X^G$ is converted by linear transformation from the tenth to lth order, and the matching distance between the segment $X_j$ and the reference pattern $X^G$ is computed.

Figure 7:
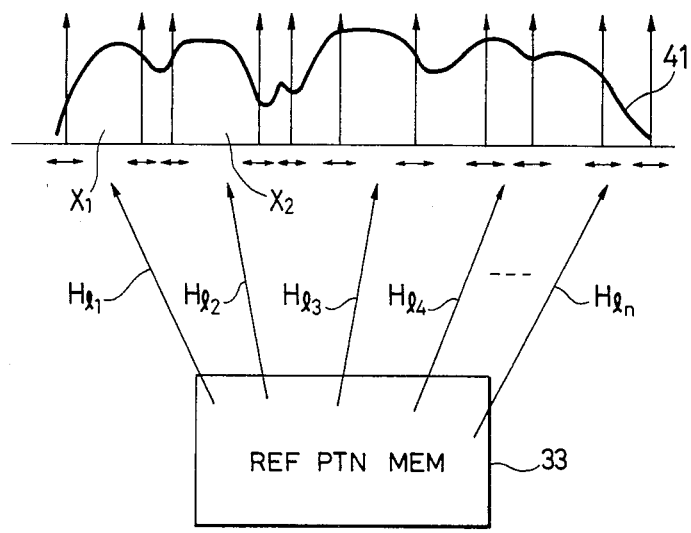
FIG. 7 is a schematic diagram showing, by way of example, the correction of segment boundaries and the quantization of a voice interval by reference patterns linearly transformed in length.

The correction of the input segment boundaries through use of dynamic programming is determined in accordance with the recursive formula of equation (5) as in the case of correcting the segment boundaries for the generation of the reference patterns. That is, in the case where a voice interval 41 of the input speech signal is divided into segments $X_1, X_2, \ldots$, as shown in FIG. 7, the correction of the segment boundaries and the selection of the reference patterns are effected so that the quantization error in the voice interval 41 may become minimum when the voice interval 41 is covered with the reference patterns $X_1^G, X_2^G, \ldots$ which have been selected from the reference pattern memory 33 and adjusted in length to the input speech segments $X_j$. Theoretically, a series of optimum reference patterns of adjusted segment lengths can be obtained by calculating the quantization errors for all possible combinations of the reference pattern sequence and the individual segment lengths for the voice interval 41. That is, by repeating correction of the segment boundaries, matching of the corrected segment sequence with the reference patterns and correction of the segment boundaries through use of the reference pattern sequence so that the quantization error is minimum, as in the case of the formation of the reference patterns. However, this involves an enormous amount of calculation. The amount of calculation needed can drastically be reduced, however, through utilization of this dynamic programming technique and by limiting the range of existence of the segment length to the length of a phoneme (10 to 320 msec). As will be appreciated from the above processing, according to the present invention, the segment length and the reference pattern are selected so that the quantization error of the reconstructed speech signal is minimized.

The input spectral time series is corrected in segment boundaries by the segment boundary correcting section 34 and each segment length is coded, as mentioned previously. The segment length code 35, the optimum reference pattern code, and pitch information code 37 of the input speech signal, available from the LPC analysis section 23, are synthesized by a multiplexer 38 into a coded output. Incidentally, the coding section 31 is usually formed by an electronic computer.

The coded output is transmitted or stored by a medium 42, as shown in FIG. 6. The code sequence available from the medium 42 is separated by a demultiplexer 43 into the segment length code, the reference pattern code, and the pitch information code. A reference pattern memory 44 which is identical with the reference pattern memory 33 is referred to by the reference pattern code, by which a reference pattern is obtained. The reference pattern is subjected to linear transformation according to the separated segment length code, restoring the spectral parameter time series. Synthesis filter coefficients of an LPC synthesizing section 45 are controlled by the spectral parameter time series, and a tone source signal produced by the separated pitch information code is supplied as a drive signal to the synthesis filter to synthesize an output corresponding to the input to the LPC analysis section 23. The synthesized output is converted by a D-A converter 46 to analog form and is provided as a synthesized analog signal at an output terminal 48 via a low-pass filter 47.

Figure 8:
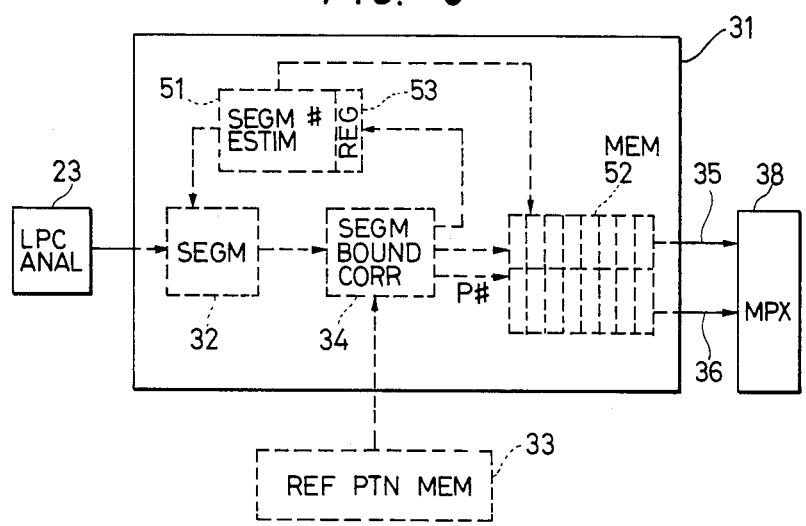
FIG. 8 is a block diagram functionally showing the procedure for estimating the number of segments.
Figure 9A:
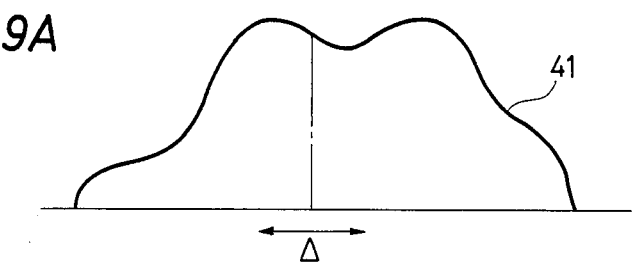
FIGS. 9A and 9B depict waveform diagrams showing the segmentation of a voice interval and the correction of segment boundaries.

The larger the number of segments into which the voice interval is divided, the smaller the quantization error, but the amount of coded output information increased. Accordingly, it is desirable that the number of segments be small and that the quantization error also be small. To meet such requirements, the coding section 31 is adapted to perform processing as follows: As depicted in FIG. 8, the spectral parameter time series of the input speech from the LPC analysis section 23 is divided by the segmentation section 32 into segments of the number specified by a segment number estimate section 51. For example, as shown in FIG. 9A, the voice interval 41 is divided into two segments. In the segment boundary correcting section 34 the segment boundaries of the divided segment sequence are corrected, by dynamic programming, within the afore-mentioned range Δ, as indicated by arrows in FIG. 9A, so that the matching distance between the divided segment sequence and the reference patterns prestored in the reference pattern memory 33 is minimized in the voice interval 41. Then codes indicating the corrected segment lengths (the segment boundaries) and the code numbers denoting the reference patterns which have the closest resemblance to the segments are stored in a memory 52 along with the corresponding number of divided segments.

Figure 9B:
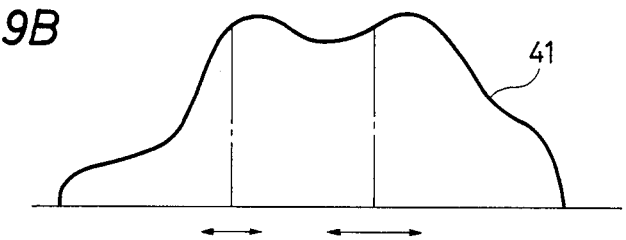

Next, the segment number estimate section 51 increases the number of segments into which the voice interval is divided in the segmentation section 32. For example, as shown in FIG. 9B, the voice interval 41 is divided into three segments. Then, in the same manner as described above, the segment boundaries of the divided segment sequence are corrected in the correcting section 34 so that the matching distance between the segment sequence and the reference patterns is minimized, and codes indicating the corrected segment lengths and the code numbers of the reference patterns which bear the closest resemblance to the segments are stored in the memory 52. Thereafter, in the same manner as described above, the number of divided segments is increased in a sequential order, and codes of corrected segment lengths and the numbers of the reference patterns which most closely resemble to the respective segments are stored in the memory 52 for each number of divided segments. At the same time, in the segment number estimate section 51, the amount of information I (bit/sec) is obtained from the number Np of all reference patterns and the number Ns of segments per sec, by I=Ns log$_2$ Np. Furthermore, letting a variation in the logarithmic value of the total quantization error (the end-point accumulated distortion $\sigma(T_M)$) and a variation of the amount of output information I, which are caused by increasing the number of segments in the voice interval, be represented by $\Delta$d (dB) and $\Delta$I (bits/sec), respectively, the smallest one of the segment numbers at which the absolute value of the rate of change $\Delta$d/$\Delta$I of the quantization error resulting from the change in the segment number is smaller than a predetermined value, is obtained. In concrete terms, the logarithmic value of the end-point accumulated error $\sigma(T_M)$ is stored in a register 53 of the segment number estimate section 51 for each segment number, and each time the end-point accumulated error $\sigma(T_M)$ is obtained, the difference between its logarithmic value and that of the end-point accumulated error for the immediately preceding segment number is obtained; the segmentation is continued until the abovesaid difference becomes smaller than a predetermined value.

Figure 10:
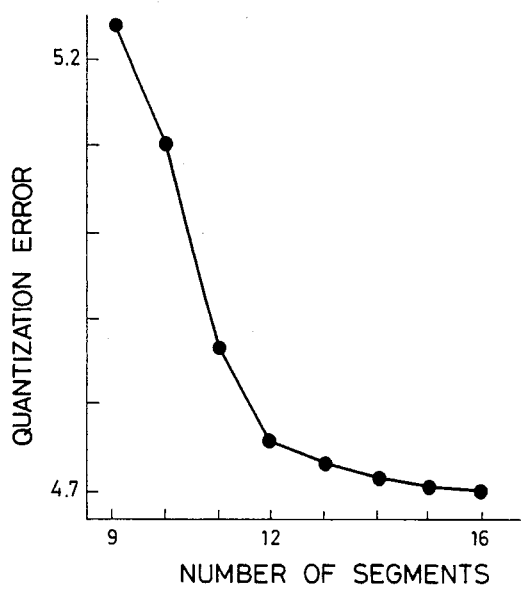
FIG. 10 is a graph showing, by way of example, quantization error vs. the number of segments.

The segmentation number and the quantization error (the end-point accumulated error) bear such a relationship as depicted in FIG. 10. The abscissa represents the segmentation number and the ordinate the quantization error $\sigma(T_M)$. FIG. 10 shows the case where the voice interval is a continuous speech around 1 sec long, the true value of the segmentation number, that is, the number of phonemes is 12, and the number of reference patterns is 64. It appears from FIG. 10 that an increase in the segmentation number causes a monotonous decrease in the quantization error and that the rate of decrease is great for segmentation numbers smaller than the true value, and for segmentation numbers larger than the true value the rate of decrease becomes smaller and saturated. This indicates that information on the segmentation number inherent in the reference patterns is reflected in the quantization error, and even if the segmentation number is selected larger than its true value the effect of reducing the quantization error will not be heightened. When the rate of reduction of the quantization error reaches a predetermined value as a result of an increase in the segmentation number, it is considered that the true number of segments is reached. Even if the number of segments is further increased, the decrease in the quantization error will be slight but the amount of information will be increased.

The code 35 which indicates the corrected segment length and the code number 36 of the reference pattern which is most similar to the segment, are read out of the memory 52 for the smallest one of the segmentation numbers which makes the absolute value of the rate of change $\Delta$d/$\Delta$I of the quantization error smaller than a predetermined value.

Figure 11:
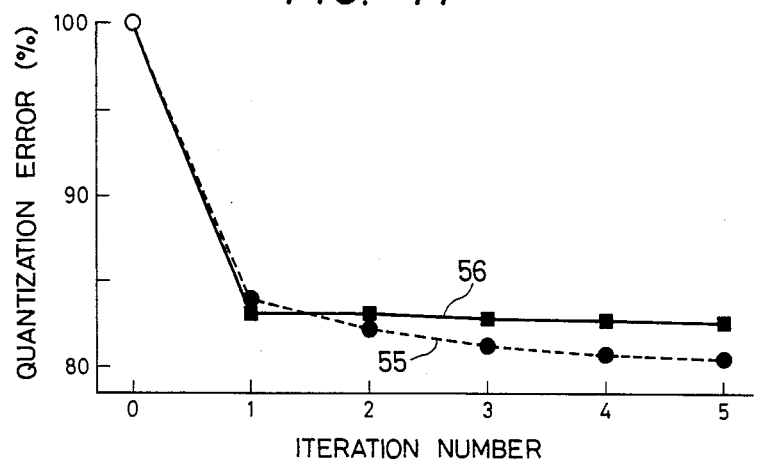
FIG. 11 is a quantization error vs. reference pattern iteration number characteristic diagram showing the robustness of this invention method for an unlearned speech.

As described previously in respect of FIG. 5, the reference pattern generating method of the present invention ensures a decrease in the total quantization error for the learned speech. It is not guaranteed, however, that the quantization error could be reduced for an unlearned speech (robustness for the unlearned speech). It is also considered that according to the reference pattern generating method of the present invention, the reference patterns are excessively tuned to the learned speech but do not present robustness for the unlearned speech. Then, the robustness for different speech contents of the same speaker was examined (under the same conditions as those in the case of FIG. 5). The experimental results are shown in FIG. 11, in which the ordinate represents the reduction ratio of the total quantization error relative to the initial total error denoted by a white circle for both the learned and unlearned speeches. The abscissa represents the pattern (segment boundary) updating or iteration number. A curve 55 indicates the robustness for the learned speech and a curve 56 the robustness for the unlearned speech. It appears from FIG. 11 that the repetition of the pattern updating causes a monotonous decrease in the total quantization error of the unlearned speech. It is therefore considered that the method of the present invention has robustness for the unlearned speech when the same speaker utters under similar conditions. Incidentally, the initial total error for unlearned speech $Q_{out}[0]$ is 13.5% of that for learned speech Q[0], and spectral envelope distortions (dB)$^2$ are 13.53 and 13.48%, respectively.

Figure 12:
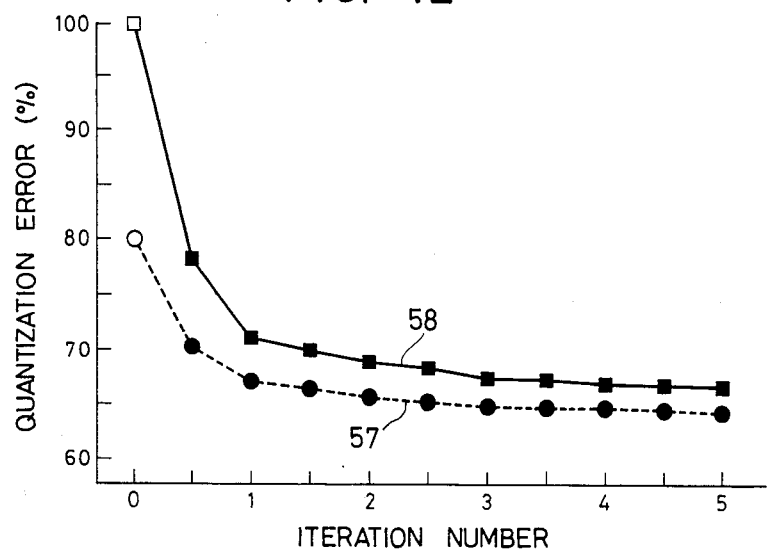
FIG. 12 is a quantization error vs. reference pattern iteration number characteristic diagram showing the influence of the initial segment boundaries.

The method of the present invention requires the initial patterns or initial segment boundaries and performs optimum covering of the voice interval with reference patterns in accordance with the initial patterns; so the total quantization error, after saturation, is influenced by the initial patterns. Then, the influence was examined, with the initial patterns changed as described below. The number of segments in the voice interval was set to the same number obtained by observation of its sonagram, and the voice interval was divided into segments of the same time length. FIG. 12 shows the experimental results of this invention method applied using the initial segment boundaries set as mentioned above. In FIG. 12, the ordinate represents the reduction ratio of the total quantization error of the equally divided segments relative to the initial total quantization error, and the abscissa represents the number of correction of the segment boundaries (patterns). A curve 57 shows the case where the segment boundaries were determined by the observation of the sonagram of the voice interval, and curve 58 shows the case where the voice interval was divided equally. It appears from FIG. 12 that where the initial segments are of the same time length, the error reduces to 67% of the initial error at the saturation point. In the case of the equally divided segments, the initial error is 20% larger than that in the case of the segments divided according to observation, but at the saturation point, the total quantization error substantially decreases to only 4% larger than in the latter case. This suggests that the influence of the initial patterns or segment boundaries on this invention method is relatively small in terms of the total quantization error.

An articulation test for 100 syllables was made in which the number of segments was 20000, the number of reference patterns was 1024, and reference patterns updated by correcting the segment boundaries once (the correction width $\Delta$=90 msec). In the case of the correction width $\Delta$=130 msec, a good quality speech having a phoneme articulation score of 78% could be obtained. In this instance, since the average number of segments is around eight per second, the spectral information of this coded speech is $8\times(10+5)=120$ bps when each segment is 5 bits long and each reference pattern is 10 bits long. Incidentally, when the phoneme articulation is 75 % or more, the sentence intelligibility is 100% for 50 out of 100 persons. Accordingly, the above-mentioned phoneme articulation score of 78% is a good result.

Figure 13:
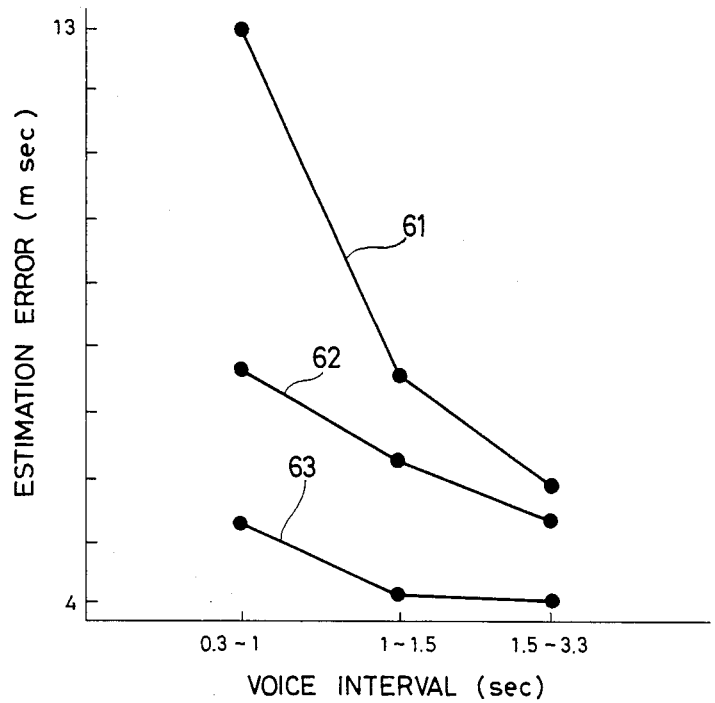
FIG. 13 is a graph showing, by way of example, an estimation error vs. voice interval length characteristic.

A speech of one male speaker was sampled at 8 KHz, the resulting spectral parameters were subjected to the LSP analysis with an analysis window length of 30 msec and a shift length of 10 msec, and the number of segments was estimated using about 2000 segments and 128 reference patterns. FIG. 13 shows the estimation error (msec) versus typical voice intervals (sec). A curve 61 indicates the case where the number of segments was estimated by dividing each voice interval by the average segment length of all the segments, and curves 62 and 63 indicate the cases where the number of segments was estimated through use of the segment number estimate section 51 depicted in FIG. 8. The number of points to be searched for the segment number was 11 including the true value point and the range of the segment number was 75 to 150% of its true value. In the case of curve 62, the reference patterns used were obtained by determining the segment boundaries through observation of the sonagram, and in the case of curve 63, the reference patterns were obtained after the correction of the segment boundaries described previously with respect to FIG. 3. FIG. 13 indicates that the accuracy of estimation of the number of segments by the present invention is higher than in the case of using the average segment length. This tendency is marked for short voice intervals of 1 second or less, in particular. Moreover, by applying to the reference patterns the sub-optimum algorithm described previously in connection with FIG. 3, the segment number estimation accuracy can be increased to twice or more that of the case of using the average segment length.

As described above, according to the reference pattern generating technique of the present invention, the segmentation of a learning speech is followed by repetition of the clustering of segments, the calculation for the centroid segment for each cluster, and the correction of the segment boundaries, and upon each repetition of these operations, the quantization error of the learning speech quantized by the centroid segments (the reference patterns) is made smaller; so that the most preferable reference patterns can be obtained. The demonstration and verification of this are as set forth previously.

Furthermore, according to the speech coding technique of the present invention, the segment boundary correction and the reference pattern selection are always repeated together so that the quantization error of the reconstructed speech is minimized, and this is carried out in the same manner as that employed for the generation of the reference patterns; namely, the quantization error becomes smaller upon each repetition of both operations. This permits speech coding which guarantees the minimization of the quantization error of the reconstructed speech. In addition, since the same measure of distance is employed for the reference pattern generation and for the speech coding, the use of the reference patterns is well matched with the coding, ensuring minimization of the quantization error.

Moreover, the determination of the number of segments of the input speech, as described previously, provides an optimum number of segments, permitting the materialization of speech coding with small quantization error and a small amount of output information.

It will be apparent that many modifications and variations may be effected without departing from the scope of the novel concepts of the present invention.

What is claimed is:

1. A reference pattern generating method comprising:
    a step for inputting a learning speech;
    a step for extracting spectral parameters of the learning speech in units of frames;
    a segmentation step for dividing a time series of extracted spectral parameters into segments for each voice interval;
    a step for clustering the segments into a plurality of clusters;
    a step for computing, for each cluster, an initial reference pattern representing the cluster;
    a correction step for correcting the segmentation boundaries of the spectral parameter time series through use of the computed reference patterns;
    a clustering step for clustering the segments of the spectral parameters corrected in segmentation boundaries into clusters each corresponding to one of the initial reference patterns; and
    a corrected reference pattern computing step for computing, for each cluster, a reference pattern representing the cluster and repeating the clustering of the learning speech through use of the computed reference patterns until a measure of error is converged, whereby corrected reference patterns are computed;
    the correction step, the clustering step, and the corrected reference pattern computing step being performed at least once and the reference patterns obtained by the last corrected reference pattern computing step being regarded as reference patterns desired to be obtained.

2. The reference pattern generating method according to claim 1, wherein each time the reference patterns are computed by the corrected reference pattern computing step, the total quantization error of the learning speech quantized by the reference patterns is computed, it is checked whether the rate of reduction of the total quantization error is smaller than a predetermined value, and if so, the repetition of the correction step, the clustering step and the corrected reference pattern computing step, is stopped.

3. A reference pattern generating method according to claim 1, wherein letting the sum of matching distances between the learning speech and the reference patterns up to a time $T_S$ in a voice interval of the learning speech be represented by $\sigma(T_S)$, candidates of segment boundaries determined beforehand by $T_s'$, the number of segments of the voice interval by M and the segment boundary correcting width by $\Delta$, the correction step determines a time $T_{S-1}$ by the following recursive formula:

$$\sigma(T_S) = \min_{T_{S-1}} \{\sigma(T_{S-1}) + d(T_{S-1}, T_S)^2\}$$

where $$|T_s' - T_{S-1}| \leq \frac{\Delta - 1}{2}, S = 1, 2, \ldots M, \sigma(T_0) = 0,$$

and d is the matching distance when the segments of the learning speech from the time $T_{S-1}$ to $T_S$ are quantized by the reference patterns.

4. A reference pattern generating method according to claim 1, wherein in the correction step and the corrected reference pattern computing step, the matching distance between the learning speech segment and the reference pattern is provided by obtaining a weighted Euclidean distance including power after subjecting the reference pattern to a linear transformation to make its length equal to the length of the learning speech segment.

5. A reference pattern generating method according to claim 1, wherein, in the step of computing the representative reference pattern for each cluster, letting the reference pattern to be computed be represented by $X^G$, a linear transformation matrix by $H_{lj}$, the segment in the cluster by $X_j$ and its length $l_j$, the reference pattern $X_j$ is computed by the following equation:

$$X^G = \left( \sum_{j=1}^{M} X_j H_{lj}^t \right) \left( \sum_{j=1}^{M} H_{lj} H_{lj}^t \right)^+$$

in a manner to minimize a measure of error given by $$D = \sum_{j=1}^{M} d(X^G, X_j)^2 = \sum_{j=1}^{M} \| X_j - X^G H_{lj} \|^2$$

whereby reference patterns of a fixed length can be computed from samples of segments of different lengths.

6. A speech coding method comprising:
a step for extracting spectral parameters of an input speech in units of frames;
a segmentation step for dividing a time series of the extracted spectral parameters into segments;
a correcting/selecting step for correcting the segment boundaries of each segment, and at the same time, selecting that one of prepared reference patterns which bears the closest resemblance to the segment so that the matching distance between the reference pattern and the segment is minimized; and
a step for outputting a code indicating the length of each segment of the spectral parameter time series divided at the corrected segment boundaries and a code indicating the reference pattern which bears the closest resemblance to the segment.

7. A speech coding method according to claim 6, wherein the segmentation step and the correcting-/selecting step are repeated while changing the segmentation number, to thereby obtain the rate of change of the matching distance which is minimum for a particular segmentation number, the smallest one of the segmentation numbers which makes the absolute value of the rate of change smaller than a predetermined value is obtained, and a code of the segment length and a code of a reference pattern obtained by the correcting/selecting step for the smallest segmentation number is output.

8. A speech coding method according to claim 6, wherein letting the sum of matching distances between the input speech and the reference patterns up to a time $T_S$ in a voice interval of the input speech be represented by $\sigma(T_S)$, candidates of segment boundaries determined beforehand by $T_s'$, the number of segments of the voice interval by M and the segment boundary correcting width by $\Delta$, a time $T_{S-1}$ for the correction of the segment boundaries in the correcting/selecting step is determined by the following recursive formula:

$$\sigma(T_S) = \min_{T_{S-1}} \{\sigma(T_{S-1}) + d(T_{S-1}, T_S)^2\}$$

where $$|T_S' - T_{S-1}| \leq \frac{\Delta - 1}{2}, S = 1, 2, \ldots M, \sigma(T_0) = 0,$$

and d is the matching distance when the input speech segments from the time $T_{S-1}$ to $T_S$ are quantized by the reference patterns.

9. A speech coding method according to claim 6, wherein in the correcting/selecting step, the matching distance between the input speech segment and the reference pattern is provided by obtaining a weighted Euclidean distance including power after subjecting the reference pattern to a linear transformation to make its length equal to the length of the input speech segment.

10. A speech coding method according to claim 4, wherein letting the input speech segment be represented by $X_j$, its length by $l_j$, the reference pattern by $X^G$, and a linear transformation matrix by $H_{lj}$, the matching distance between the input speech segment and the reference pattern is obtained by performing the following equation:

$$D = \sum_{j=1}^{M} d(X^G, X_j)^2 = \sum_{j=1}^{M} \| X_j - X^G H_{lj} \|^2,$$

whereby the distances between input speech segments of different length and reference patterns of a fixed length are computed.

* * * * *